US006754241B1

(12) United States Patent
Krishnamurthy et al.

(10) Patent No.: US 6,754,241 B1
(45) Date of Patent: Jun. 22, 2004

(54) COMPUTER SYSTEM FOR STATISTICAL MULTIPLEXING OF BITSTREAMS

(75) Inventors: Ravi Krishnamurthy, Princeton, NJ (US); Sriram Sethuraman, Hightstown, NJ (US); Xiaobing Lee, Monmouth Junction, NJ (US); Tihao Chiang, Taipei (TW)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/478,128

(22) Filed: Jan. 5, 2000

Related U.S. Application Data (60) Provisional application No. 60/114,834, filed on Jan. 6, 1999, provisional application No. 60/114,842, filed on Jan. 6, 1999, and provisional application No. 60/170,883, filed on Dec. 15, 1999.

(51) Int. Cl.[7] .................................................. H04J 3/02

(52) U.S. Cl. ...................... 370/537; 370/538; 370/540; 348/423.1

(58) Field of Search ............................... 370/537, 538, 370/539, 540, 536, 468, 577, 434, 435, 234, 235, 532–535, 477; 348/385, 387, 419, 500, 423.1; 382/232, 234

(56) References Cited

U.S. PATENT DOCUMENTS

| | | | |
|---|---|---|---|
| 5,506,844 A | * 4/1996 | Rao | 370/468 |
| 5,657,091 A | 8/1997 | Bertram | 348/559 |
| 5,796,724 A | 8/1998 | Rajamani et al. | 370/263 |
| 5,850,527 A | 12/1998 | Suzuki | 395/200.77 |
| 5,877,814 A | * 3/1999 | Reininger et al. | 348/500 |
| 5,878,166 A | * 3/1999 | Legall | 382/232 |
| 5,956,426 A | * 9/1999 | Matsuura et al. | 382/239 |

(List continued on next page.)

FOREIGN PATENT DOCUMENTS

| | | | | |
|---|---|---|---|---|
| GB | 2316519 A | 2/1998 | ............ | H04Q/7/14 |
| GB | 2318021 A | 4/1998 | ............ | H04N/7/14 |
| WO | WO 95/29545 | 11/1995 | ............ | H04J/3/16 |
| WO | WO 97/18676 | 5/1997 | | |
| WO | WO 98/11687 | 3/1998 | ............ | H04J/3/16 |

OTHER PUBLICATIONS

"Bandwidth Renegotiation for VBR Video Over ATM Networks", by Daniel J. Reininger et al., IEEE Journal on Selected Areas in Communications, vol. 14, No. 6, Aug. 1996, XP 000620594, pp. 1076–1085.

(List continued on next page.)

*Primary Examiner*—Wellington Chin
*Assistant Examiner*—Chuong Ho
(74) *Attorney, Agent, or Firm*—William J. Burke (57) ABSTRACT

A PC-type computer has a system bus (e.g., a PCI bus) configured with a main CPU board, a statistical multiplexing (stat-mux) board, and a plurality of video/audio encoder boards, each configured to receive and compress a corresponding video/audio stream. The stat-mux board performs statistical multiplexing on the different compressed bitstreams to transmit multiple bitstreams over individual shared communication channels. Although each of the boards is configured to the system bus, each encoder board has a digital signal processor (DSP) with a synchronized serial interface (SSI) output port that is directly connected to an SSI input port on a DSP on the stat-mux board (which, in one embodiment, has four such DSPs each with six such SSI input ports). As such, (up to 24) compressed video/audio bitstreams generated on the various encoder boards can be transmitted directly to the stat-mux board without having to go through the system bus. In this way, the computer system can provide statistical multiplexing of low-latency video/audio bitstreams without having to suffer the processing delays associated with conventional transmission over PCI system buses.

11 Claims, 4 Drawing Sheets

U.S. PATENT DOCUMENTS

| | | | | |
|---|---|---|---|---|
| 6,185,229 B1 | * | 2/2001 | Obikane et al. | 370/537 |
| 6,487,535 B1 | * | 11/2002 | Smyth et al. | 704/500 |
| 6,490,250 B1 | * | 12/2002 | Hinchley et al. | 370/232 |
| 6,493,388 B1 | | 12/2002 | Wang | 375/240.12 |
| 6,570,888 B1 | * | 5/2003 | Huang et al. | 370/468 |

OTHER PUBLICATIONS

"On the Accuracy of Admission Control Tests", by Edward W. Knightly, 1997 International Conference on Network Protocols (Cat. No. 97TB100174), Atlanta, GA, Oct. 28–31, 1997, XP–002139186, pp. 125–133.

"Communications Requirements of Multimedia Applications: A Preliminary Study", by Timothy Kwok, 1992 IEEE International Conference on Selected Topics in Wireless Communications, Conference Proceedings (Cat. No. 92TH0462–2), Vancouver, BC, Canada, Jun. 25–26, 1992, XP–002139187, pp. 138–142.

"A New Multiaccess Technique for Multimedia Wireless LANs", by Benny Bing et al., IEEE Global Telecommunications Conference, Conference Record (Cat. No. 97CH36125), Phoenix, AZ, Nov. 3–8, 1997, vol. 3, XP002139188, pp. 1318–1322.

* cited by examiner

COMPUTER SYSTEM FOR STATISTICAL MULTIPLEXING OF BITSTREAMS

CROSS-REFERENCE TO RELATED APPLICATIONS

This application claims the benefit of the filing dates of U.S. provisional application No. 60/114,834, filed on Jan. 6, 1999, U.S. provisional application No. 60/114,842, filed on Jan. 6, 1999, and U.S. provisional application No. 60/170,833, filed on Dec. 15, 1999 using U.S. Express Mail Label No. EL416189565US.

BACKGROUND OF THE INVENTION

1. Field of the Invention

The present invention relates to video/audio compression processing, and, in particular, to computer systems designed to compress and transmit multiple video/audio bitstreams over shared communication channels.

2. Description of the Related Art

As the available bandwidth of communication channels gets larger as technology improves, the possibility exists to transmit multiple different bitstreams (e.g., corresponding to different video/audio applications, such as television programming, distributed interactive video games, web browsing, and/or e-mail) simultaneously over individual shared, high-bandwidth channels. Such transmission of multiple bitstreams over each shared communication channel may be implemented efficiently by employing a suitable statistical multiplexing scheme that controls—at some level—both (1) the compression processing by one or more video/audio encoders of the individual application streams into corresponding compressed bitstreams and (2) the transmission of data from those different compressed bitstreams over the shared communication channel. Statistical multiplexing can be defined as:

(a) the control required for allocation of bits in proportion to the complexity and importance of each application within the limits of control allowed by each encoder, such that:
  (i) the aggregate instantaneous bit rate is less than or equal to the channel capacity;
  (ii) the minimum quality of service (QoS) requirements for all applications are met; and
  (iii) the quality is maximized for applications in the order of their importance; and
(b) the control required in pathological cases, where the aggregate instantaneous bit rate is greater than the channel capacity, to minimize the loss in QoS for as minimal a number of applications as possible.

To achieve these levels of control, statistical multiplexing takes into account the variations in bit rate of different applications when allocating transmission bandwidth.

Statistical multiplexing schemes often involve the implementation of a dynamic bandwidth manager that controls the allocation of bandwidth to the various applications in real time. Such bandwidth managers are able to monitor the real-time bit-rate demands of the different applications to control the transmission of data from those different applications over the shared communication channel.

For conventional applications, such as video/audio streaming of digital television programming, which involves the one-way transmission of a compressed bitstream from an application server to one or more remote users, the quality of service depends on the fidelity and uniformity of the video playback, where collectively high fidelity and high uniformity typical mean (1) uniform, full frame rates and (2) uniform high image quality both within each frame and between consecutive frames. For these applications, the end-to-end latency involved in the processing is of less importance. As such, the primary concern of bandwidth managers for conventional statistical multiplexing schemes involving conventional applications is to ensure that there will always be sufficient data in the receiver buffer at each user node to provide high fidelity, uniform video playback to each user.

High levels of latency, however, are not acceptable for all applications. Many interactive video/audio applications, such as video conferencing and distributed video games where two or more remotely located users compete against each other, require relatively low levels of latency—in addition to high levels of uniformity and fidelity—for acceptable QoS levels. Moreover, in many multiplexing situations, different applications will have different latency requirements. Furthermore, the latency requirements of even some individual applications, such as web browsing, may vary over time, when the type of service changes during the application session. For all these situations, conventional computer systems—even conventional computer systems designed for conventional statistical multiplexing schemes—will not provide acceptable QoS levels, because they do not take into account the different and varying levels of latency required by the different applications being multiplexed for transmission over a shared communication channel.

SUMMARY OF THE INVENTION

The present invention is directed to computer systems designed to support statistical multiplexing schemes that do take into account the corresponding latency requirements of different video/audio applications (in addition to other factors such as uniformity and fidelity of video playback) when managing the bandwidth of shared communication channels. According to embodiments of the present invention, the computer systems support statistical multiplexing that takes latency into account to provide (a) traffic control (i.e., the control of how the data for multiple compressed bitstreams is transmitted over each shared communication channel) as well as (b) some level of control over the actual compression processing used to generate those bitstreams for the different video/audio applications.

According to one embodiment, the present invention is a computer system, comprising (a) a plurality of encoding sub-systems, each encoding sub-system having (1) an input port configured to receive an input data stream; and (2) an output port configured to transmit a corresponding compressed bitstream generated by the encoder from the input data stream; and (b) a statistical multiplexing (stat-mux) sub-system having (1) a plurality of input ports, each input port configured directly to the output port of a corresponding encoding sub-system to receive the corresponding compressed bitstream; and (2) an output port configured to transmit data generated as a result of the stat-mux sub-system performing statistical multiplexing on the plurality of compressed bitstreams.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
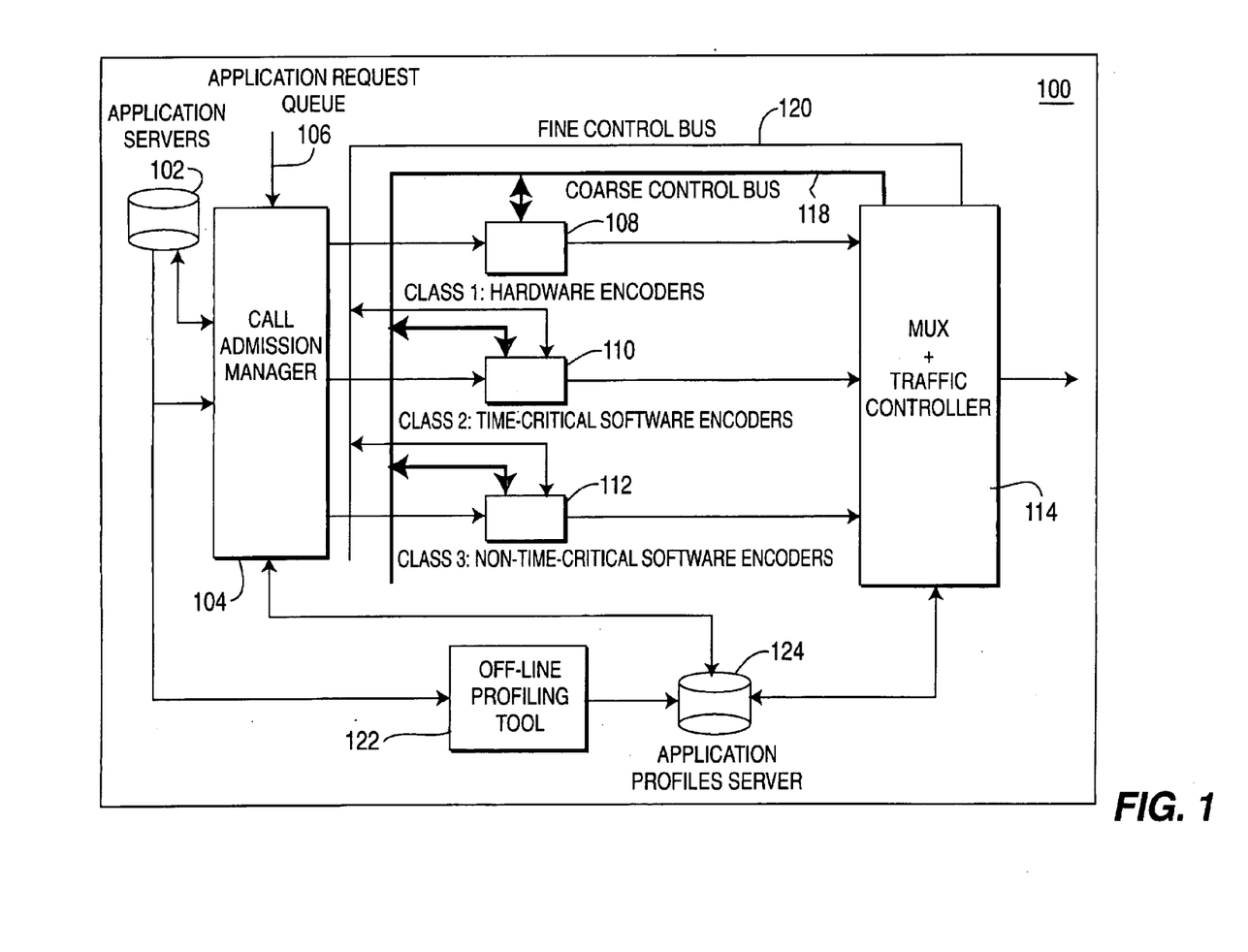
FIG. 1 shows a block diagram of a video processing system, according to one embodiment of the present invention.

FIG. 1 shows a block diagram of a video processing system 100, according to one embodiment of the present invention. Video processing system 100 compresses multiple video streams corresponding to different video applications for transmission over a single shared communication channel 116. The different video applications may include any suitable combination of different type of video applications including video conferencing, interactive video games having different levels of sophistication, web browsing, and electronic mail. Depending on the implementation, the shared communication channel may be any suitable transmission path that supports the concurrent transmission of multiple data streams, such as Ethernet, TCP/IP, Broadband networks, satellite, cable transmission, ADSL, DSL, and cable modem.

In particular, one or more application servers 102 provide multiple video streams to a service admission manager 104, which manages the admission of new video application sessions onto the system. In response to a request for admission by a new video application (received from application request queue 106), service admission manager 104 (a) determines whether to accept the request and admit the new video application and, if so, (b) assigns the new video application to an appropriate video encoder.

As indicated in FIG. 1, video processing systems in accordance with the present invention have multiple video encoders available to perform the required video compression processing for the different video applications, where different video encoders may provide different levels of video compression processing power (e.g., in terms of frame rate and image fidelity). In general, differing levels of video compression processing power make these different video encoders more or less suitable for different video applications having differing bandwidth and latency requirements. High-demand video applications, such as high-end interactive video games, typically have high bandwidth and low latency requirements. At the other end of the spectrum, low-demand video applications, such as web browsing and electronic mail, typically have low bandwidth and high latency requirements. In between are video applications, such as video streaming and video conferencing, that typically have intermediate to high bandwidth requirements and intermediate to low latency requirements.

In addition to video compression processing power, video encoders may also differ in the degree to which external processors are able to control the details of their internal compression processing. For example, some video encoders may provide external control only at the frame level (e.g., in terms of specifying target bit rates and/or average quantization levels per frame). Other video encoders may also provide external control at the sub-frame level (e.g., in terms of specifying target bit rates and quantization levels at the slice or even macroblock level within each frame).

Although video compression processing power and the degree of external control over internal compression processing are technically both continuous and independent parameters, video encoders can be grouped into three basic classes, as shown in FIG. 1.

Class 1 encoders 108 provide relatively high levels of video compression processing power (e.g., in terms of high frame rates and high image fidelity), while providing relatively low levels of external control over their internal video compression processing. Class 1 video encoders, such as typical hardware encoders, are suitable for video applications requiring both high bandwidth and low latency, such as high-end interactive video games.

Class 2 encoders 110 provide slightly lower levels of video compression processing power than Class 1 encoders 108, but higher levels of external control over their internal video compression processing. Class 2 video encoders, which are typically high-end software encoders, are suitable for (a) video applications requiring slightly lower bandwidth and/or slightly higher latency, such as video streaming applications and low-end interactive video games.

Lastly, Class 3 encoders 112 provide even lower levels of video compression processing power than Class 2 video encoders 110 with similar or higher levels of external control over their internal video compression processing. Class 3 encoders, which are typically low-end software encoders, are suitable for non-time-critical (i.e., high latency) applications with either high or low bandwidth requirements, such as web browsing and electronic mail.

As shown in FIG. 1, video processing system 100 also has a multiplexer (mux) and traffic controller 114 (also referred to herein simply as the multiplexer), which controls the transmission of data from the compressed video bitstreams generated by the various video encoders over the shared communication channel 116. In addition, controller 114 uses information corresponding to the various compressed video bitstreams (generated by the various video encoders) to generate control signals that are transmitted back to one or more of the video encoders to adaptively control—at least at some level—the video compression processing performed by those video encoders. The information may include current frame rate, number of bits per frame, picture type, picture duration, picture capture time, and other statistics, such as scene change information, picture variance, motion-compensated error variance, and mode statistics (e.g., number of intra vs. inter macroblocks). Depending on the implementation, different types of information can be generated and reported at frame level, slice level, or picture unit level.

As indicated in FIG. 1, controller 114 generates two types of video compression control signals: (1) coarse control signals used to control video compression processing, e.g., at the frame level and (2) fine control signals used to control video compression processing at a finer level, e.g., at the sub-frame level. Controller 114 transmits specific coarse video compression control signals to any of the individual video encoders over a coarse control bus 118. In addition, controller 114 transmits specific fine video compression control signals to any individual video encoders (e.g., Class 1 encoders 108 and Class 2 encoders 110) that provide finer external control (e.g., at the sub-frame level) over their internal video compression processing over a fine control bus 120. Coarse video compression control signals correspond to relatively high-level control over video compression processing and may include frame rates, target numbers of bits per frame, and/or average quantization levels over a frame. Fine video compression control signals, on the other hand, correspond to relatively low-level control over video compression processing and may include target numbers of bits per slice within a frame, average quantization levels per slice or even per macroblock within a frame. Other types of fine video compression control signals will be described later in this specification.

In addition to information for each compressed video bitstream, controller 114 takes into account both bandwidth and latency requirements of the various corresponding video applications when performing both its traffic control and compression control functions.

Video processing system 100 also has an off-line profiling tool 122, which analyzes, in non-real-time, typical sets of video sequences corresponding to different types of video applications and stores the results of those analyses in an application profiles server 124. The service admission manager 104 accesses information in the application profiles server 124 in order (1) to determine whether to admit a particular new video application and, if so, (2) to determine to which video encoder to assign the newly admitted video application. In addition, controller 114 also accesses information in the application profiles server 124 in order to (1) determine an acceptable level of buffering for at least one video application and (2) order packets of data from different video applications. Moreover, if there is profile information on the nominal MQUANT and MQUANT tolerance that can be used to encode a particular application, the controller can attempt to maintain this constraint on all the encoders. As another example, if region of interest information is available, and slice level MQUANT setting is possible, the controller can intelligently trade-off and change the MQUANT over a frame. Similar control for frame-rate and spatial resolution is also possible.

According to the embodiment shown in FIG. 1, video processing system 100 has one or more Class 1 encoders 108, one or more Class 2 encoders 110, and one or more Class 3 encoders 112. It will be understood that, in alternative implementations of the present invention, video processing systems may have fewer or more different classes of encoders available, including those (hardware or software) encoders that provide no degree of external control over their internal video compression processing. With this latter class of "uncontrolled" encoders, the traffic controller processes the corresponding received compressed video bitstreams for transmission over the shared communication channel in an open-loop manner. Nevertheless, even in these situations, the traffic controller may be able to exercise some "post-processing" control by altering the bitstream before transmission by dropping frames or even replacing portions of frames such as slices or individual macroblocks with special skip codes. Since the encoders will be unaware of these changes, such post-processing control may adversely affect the quality of the video playback at the end users.

Furthermore, as new and improved software encoders provide higher and higher levels of video compression processing power, not to mention greater and greater levels of external control, hardware encoders might not be needed at all in video processing system 100, even for high-end interactive video games.

The main operations of video processing system 100 correspond to three different generic functions: (1) off-line application profiling for content classification (implemented by off-line profiling tool 122), (2) service admission processing (implemented by service admission manager 104), and (3) traffic and compression control (implemented by controller 114). Each of these three functions is described in further detail in the following sections.

Off-Line Application Profiling for Content Classification

As mentioned earlier, off-line profiling tool 122 analyzes, in non-real-time, typical sets of video sequences corresponding to different types of video applications and stores the results of those analyses in application profiles server 124. In a preferred implementation, the profiling is semi-automatic and each video application is characterized according to the following parameters:

(a) Level of interactivity (related to latency tolerance);

(b) Extent of frame-to-frame motion (both peak and average);

(c) Encoding resource requirement (i.e., identification of acceptable classes of encoders) and the levels of external control offered by those encoders;

(d) Type of graphics driver and ability to intercept the graphics commands;

(e) Bit rates required (both peak and average) for acceptable quality. The peak can be obtained by performing I-frame-only encoding at an acceptable average frame-level quantization (MQUANT) level and picking its peak. The average bit rate can be obtained by IP-only encoding (i.e., no B frames) at the same MQUANT level.

(f) Minimum frame rate required to achieve acceptable quality for the application.

(g) Required spatial resolution determined by identifying the highest spatial frequency present (e.g., from quantized DCT coefficients), and characterizing how critical the high-frequency components are for the application.

(h) Region of Interest (RoI): In many applications, especially video games, the RoI can be bounded within a region. Knowledge of this can help the encoder as well as the multiplexer.

(i) Objectionable artifacts: Some applications may be very sensitive to frame dropping, others may be sensitive to slice dropping, and still others may be sensitive to spatial adaptation of the quantizer. This profile will suggest the best overflow handling strategy at the multiplexer as well as the best way to control the encoder.

After a sufficient number of video applications have been analyzed off-line according to the preceding parameters, profiling tool 122 processes the various results to make generalizations about groups of video applications based on their collective similarities and respective differences in order to generate rules used by video processing system 100 in real-time processing of other video applications. Such profiling can be relatively simple, such as characterizing the level of interactivity of different video applications as either "high," "intermediate," or "low." Alternatively, more and more sophisticated schemes can be implemented. The resulting profile information is stored in application profiles server 124 for eventual use by service admission manager 104 for initial service admission as well as by controller 114 for traffic control and multiplexing. In addition, the service provider for a particular video application may be able to maintain user profiles which indicate the behavior of particular users (such as type of games played, levels reached, typical browsing patterns, etc.). This information might only be used as a second-order control, since there may be multiple users with access to a particular user node.

Service Admission Processing

Service admission manager 104 determines the mix of the active applications at any given time. The main task of this tool will be to ensure that only services for which (a) the required encoder resources are available and (b) a minimum QoS can be guaranteed for the entire session, are admitted into a multiplex pool. The service admission decision is based on the profiles of the applications that are requested. In one possible implementation, the different video applications are divided into the following classes:

(C1) High-end video games having very stringent latency requirements, high motion, and high spatial complexity, requiring hardware encoders to achieve high bandwidth and low latency, even though there is little external control over the video compression processing;

(C2) Low-end video games having moderate to high latency requirements and lower encoding complexity, that can be processed using high-end software encoders to achieve low latency; and (C3) Web browsing and e-mail applications with high latency requirements that can be processed using low-end software encoders.

When a request is made to add a new application, service admission manager 104 obtains the following information from application profiles server 124:

(1) Class of application (e.g., video game (high-end, intermediate, or low-end), web browsing, e-mail, etc.);

(2) Interactivity of application (usually represented as latency requirement and classification in the profiles server) used in classifying the service, service admission, assignment of resources, control of encoder, and traffic control;

(3) Motion extent used to determine the frame rate required for the application, which is used by the controller to control the encoders. It can also be used for resource allocation to assign an encoder to the application;

(4) Peak bandwidth required; and (5) Average bandwidth required.

Based on this information, service admission manager 104 will admit the new application, if and only if both of the following two rules would be satisfied after admitting the new application:

(a) Sum of the peak bandwidths for all C1 applications plus sum of the average bandwidths for all C2 applications is less than the total channel bandwidth; and (b) Sum of average bit rates of all applications (i.e., C1, C2, and C3) is less than the total channel bandwidth; and (c) Encoding resources are available for the new application.

The first rule is fairly conservative, and applies to relatively simple implementations of the present invention. For more sophisticated implementations in which controller 114 is provided a high degree of control (i.e., more fine control) over the video compression processing implemented within the various video encoders, the first rule can be relaxed. Such fine control may involve control of slice-level and even macroblock-level quantizers as well as the staggering of intra frames across different applications (to ensure that a limited number of applications have intra frame within the same frame time). In that case, service admission manager 104 can use a more complicated formula depending on the QoS requirements of the various video applications and take further advantage of the statistical nature of video streams. Thus, more applications across the various types may be able to be admitted, as compared to the above solution, which is constrained based on the peak bandwidths of the C1 applications. Note that the motion extent and interactivity can also be used to allocate encoding resources to application.

An alternative call admission strategy would be to replace the stringent first condition by:

Maximum of the sum of the peak bandwidths of concurrent I frames possible at a time based on the GOP structures for C1 applications+the sum of the average bandwidths of the remaining applications is less than the total channel bandwidth.

Such a policy would allow more C1 applications. However, it should be noted that the probability of not meeting the minimum QoS at a given time instant increases as the number of active applications increase.

GOP Structure and Big Picture Handling

In one implementation of video processing system 100, low latency applications are assigned to video encoders that use only short GOP structures having only I and P (and no B) frames, such as IPPP, where every fourth frame is an I frame. Using shorter GOP structures supports interactivity. However, since I frames appear so frequently, hardware encoders may be required for such applications. In any case, the GOP period should be less than two seconds to handle errors as well as to allow decoder resynchronization when the user flips through channels. For some software encoders that provide a high degree of external control, an adaptive intra-refresh strategy can be used to avoid having to send I frames so frequently. Instead, different parts of each frame are intra-refreshed in different P pictures over a period corresponding to a chosen GOP size.

Traffic and Compression Control

Multiplexer and traffic controller 114 handles the following tasks:

(a) advance bit allocation for each video encoder based on the spatial and temporal quality desired for the corresponding application, (b) multiplexing the different bitstreams while meeting the latency requirements of each application, and (c) handling the pathological cases in such a way to minimize noticeable QoS degradation and to communicate the handling strategy to the controllable encoders.

Due to the varying degrees of control available at the different encoders, the bit allocation and buffer control range from a mere frame-level interaction between controller 114 and each encoder to finer levels, such as at the slice- or even macroblock-level. In addition, the fact that the different applications are not frame synchronized can be exploited to provide frame- (or finer) level control of other services, while responding to an unexpectedly high instantaneous bit rate from a particular service. In other words, the individual encoders can be staggered with respect to one another over the frame time to allow controller 114 to control the compression processing for certain applications based on the results of compression processing for other applications that fall later within the same frame time.

For one implementation of video processing system 100, the impact of the varying degrees of control and the varying QoS requirements for each class are briefly summarized below:

Class C1 applications: These are encoded using hardware encoders that may provide external control over only the specification of frame-level target number of bits and average MQUANT over the frame.

Class C2 applications: These are games that are software encoded and do not take a very large bandwidth. The applications are encoded without B frames using GOP structures in which I frames may be encoded at relatively large intervals. Implementing an adaptive macroblock refresh strategy that will intra-code a fraction of the macroblocks in every P frame can support switching back and forth between applications while containing error propagation as well. This will smooth out the bit profile. Any variations will come from content and not from the GOP structure and picture types. Note that Class C2 applications require low latency encoding/multiplexing. Controller 114 acts as a video rate controller and controls the picture type, rate, etc. The control is hierarchical: at one level, picture type and frame-level targets are controlled; at another level, slice-level targets are controlled. The adaptive refresh strategy is also staggered across the different mid-range encoders and are scheduled to coincide with the valleys between the peaks of the Class C1 applications whenever possible.

Class C3 applications: It is assumed that web browsing and email applications have virtually no QoS requirements compared to Class C1 and C2 applications. Class C3 applications can be scheduled in the gaps and valleys of the bit profiles of the other services, so as to increase channel utilization. Hence, their latencies can be quite high (of the order of several frame times). For more sophisticate encoding and multiplexing strategies, a dynamic QoS for these services can be determined on the fly and bandwidth allocation proportional to this dynamic QoS can be made.

Advance Bit-allocation to Various Sources

Advance bit allocation refers to allocation of a fraction of the instantaneous bandwidth to each encoder based on its past statistics without actually knowing the actual complexity of the current frame. This is important for applications having low-latency requirements, which preclude look-ahead based bit allocation. The advance bit allocation for each encoder is implemented based on:

(a) the minimum spatial quality setting needed for the corresponding application;

(b) the complexity and average MQUANT for the previous frame of the same picture type; and (c) the encoder buffer fullness.

In addition, the control can also decide to skip frames based on the quality requirements.

Since the applications are not synchronized at the frame level, a frame-level target is computed for the encoder that will start encoding a frame next (at any given time), based on the average MQUANT chosen for that encoder. Using a rate-distortion model linking bit consumption, average MQUANT, and motion compensated distortion, and enforcing constraints on MQUANT, the bit count for a frame can be estimated from prior data. An example of the constraint on MQUANT can be that the quality is uniform across the applications, while ensuring that the temporal rate of change of average MQUANT is within a tolerance threshold. The channel bit rate is divided between the applications according to their respective complexities and relative significance. The complexities are updated on the fly, and the relative significance can be obtained from the results of off-line profiling stored in application profiles server 124.

For the less controllable encoders, only the frame-level target (or average MQUANT) might be able to be communicated to the encoder. For the more controllable encoders, the basic unit of operation will be a slice (e.g., a row of macroblocks). Because the encoders are not synchronized, this will require a worst-case buffer requirement of 2 slices.

A slice-level target is computed for each controllable encoder based on the frame target, the buffer fullness for that encoder (which is indicative of the buffer delay), and the instantaneous bit rate available after deducting the bits (within a latency window) from the less controllable encoders. The slice targets are also constrained by the fact that MQUANTs cannot change too much within a frame.

For Class C3 applications, a one-frame bit buffer is used. In other words, the encoders encode a new frame only after all the bits for the frame that was encoded before the last frame have been transmitted by controller 114. This on-demand encoding eliminates the possibility of congestion due to Class C3 services. Other strategies to tune the encoding to suit the application's demands are discussed in the following section.

Channel Bandwidth Allocation—Embodiment #1

Channel bandwidth allocation is different from the instantaneous bit rate from each encoder because of the mux buffer in controller 114. A certain amount of mux buffering is needed to prevent the individual rate controllers from entering into an oscillatory mode, constantly correcting the allocation and ending up with a highly varying spatial quality across a frame. However, the statistical multiplexing gain tends to be higher as multiplex is performed at a finer level. Hence, the actual amount of buffering has to be chosen carefully. The exact amount of buffering at controller 114 for particular applications depends on their latency requirements and the strategies used for handling pathological cases. The channel bandwidth allocation step implemented by controller 114 ensures that the latency requirement for each application is met. For example, up to 10-ms latencies can be allowed for the multiplexing delay for Class 1 and 2 encoders. Alternatively, mux buffering can be tailored based on actual data.

The allocation decisions for all applications are made at the slice level. After all the bits for a slice in each encoder arrive at controller 114, the allocation is made based on the buffer fullness and the latency requirement for the application. This can be done in two steps: (1) each application in Classes C1 and C2 is allocated a bandwidth that is the minimum of the buffer occupancy and the slice-level bit rate used by service admission manager 104, and (2) the remaining bandwidth, if any, is then distributed among all the applications, in turn, to meet their latency requirements. Class C1 applications take precedence over Class C2, and Class C2 takes precedence over Class C3. Hence, Class C3 bits are transmitted only when bits remain in an allocation after the latency requirement for Classes C1 and C2 are met. The buffer occupancy is maintained below the maximum allowed buffer delay for a service during normal operation. The exceptions (i.e., when the requirement for Classes C1 and C2 cannot be met) are handled under the pathological cases.

Channel Bandwidth Allocation—Embodiment #2

Assume that the following profile is available for each frame (or data unit) of the source:

(1) Lnom (Nominal Latency): This is the latency up to which the user will not perceive any appreciable decrease in quality; and (2) Lmax (Maximum Latency): This is the latency above which quality is completely unacceptable to the user. As such, if latency will exceed this, the frame might as well be dropped.

Figures 2, 3:
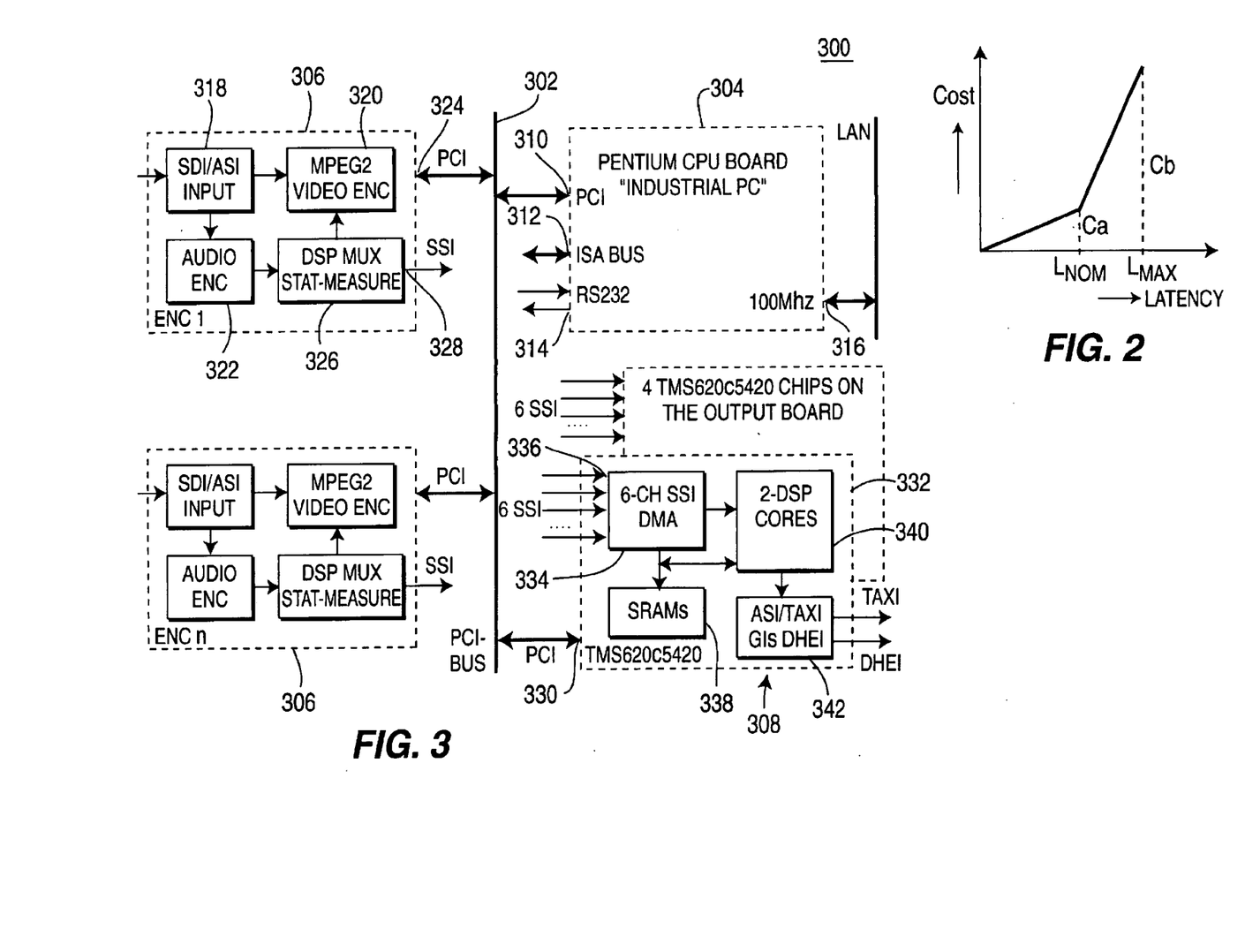
FIG. 2 shows an assumed piecewise linear cost function based on latency.
FIG. 3 shows a system-level block diagram of a computer system, according to one embodiment of the present invention.

FIG. 2 shows an assumed piecewise linear cost function based on latency. This is the quality measure in terms of latency for a frame that will be used in statistical multiplexing. The costs Ca and Cb in FIG. 2 are obtained from off-line profiling.

For the control system, the following variables are described. Assume that the current time is Tcurr, and let the time for encoding a frame of encoder i be Tfi.

Definitions

State of system

The state of the system is described by a set of vectors, Pij={Nij=number of bits in frame j of encoder i, Tij=time spent by frame so far in physical multiplexer (PM) buffer}, where i=0, 1, 2, ... N, where N=number of encoders, j runs over the frames in PM buffer for encoder i.

Input Measurements

In the control system, the following measurement data is received from the encoders:

Picture capture time;
Picture type;
Picture duration;
Average MQUANT used to encode the picture;
Number of bits used to encode the picture;
Advanced statistics such as macroblock variance and other macroblock activity measures;
Whether the picture corresponds to a scene change; and
Similar information for different groups of macroblocks within a picture.

The collection of such information over an interval {Tcurr−M*Tfi, Tcurr}, is denoted as Mij for all the frames in that interval.

Output Measurements

Output measurements are derived from input measurements and from the state of the system. Essentially this measurement is the latency of a frame Lij={Tij when the last bit leaves buffer} and {Spatial quality measured by average MQUANT}. The controller attempts to control and minimize these costs.

Traffic Control and Allocation of Channel Bandwidth Among the Sources

Each encoder has Mi frames in the buffer, some of which may be partial frames. Let bij be the bits transmitted from each frame of each encoder i. The problem is then to allocate bij such that Σbij<=Bagg, while ensuring that the frame latency is met. The following iterative procedure provides this:

(1) Initialize bij. If Bagg is the total bits available, bij is chosen to be proportional to Cost (time_spent_so_far).
(2) Given bij, calculate the expected frame latency αij= Expected Value {frame_latency|bij, Pij, Mij}. This is a modeling problem that estimates the time spent by frame ij in the physical multiplexer, given the current state and current measurements of the system, and the current allocation. This is accomplished by simulating the action of the physical MUX over the next few time-grains (until the frame is transmitted). This involves prediction of future values of bij, which can use the same formula as the initialization step 1.
(3) Update bij in proportion to the expected latencies of the sources.
(4) Repeat Steps 2 and 3 until convergence when bij is stable, i.e., does not change by a large amount. A formula ‖Δbij‖<x*‖bij‖ is used, where x is nominally 10%.

Congestion Control

Good service admission procedures can reduce the number of pathological cases for hardware encoders. Still, pathological cases will happen due to the fact that profiling cannot provide accurate slice peaks. Small deviations in latency requirements can be relaxed, hoping that the rest of the frame will not be equally hard to code. Controller 114 may drop packets, but then processing cannot recover till the next I frame. If picture types can be requested, then controller 114 can request an I frame from the encoder after dropping packets. If picture type cannot be dictated, it may be preferable to delay the frames instead of allowing packet dropping. Then, at the next I frame, the buffer can be flushed thereby dropping packets right before the I frame and resynchronization can then be established with the I frame.

For software encoders, the tighter control explained before will significantly reduce catastrophic breakdowns. However, in case it occurs, controller 114 drops slices and communicates that information back to the encoder. The encoder can keep track of the decoder state. A good strategy at the multiplexer is to drop the whole slice, and instead send a slice with all skipped macroblocks instead. If the encoder knows this information, it can refresh these macroblocks so that the decoder can recover. Alternatively, the encoder may have the ability to save a previous reference frame. In that case, when controller 114 drops a P frame or even just a slice of a P frame, it can inform the encoder so that the encoder will use the previous P frame for subsequent encoding, thereby avoiding prediction errors between the encoder and decoder.

Encoder Optimizations and Tuning for Low-Latency Applications

The overall system latency is the sum of the latencies introduced by the following components:

(1) Decoder Latency: At worst case, this is a delay of 2-frame duration, including the decoding delay and the display delay. A higher frame rate will lead to reduced decoder latency. For frame pictures, this delay will be 66 ms for 30 frames per second (fps). This latency can be reduced by up to 16.5 ms by using field pictures, instead of frame pictures.

(2) Encoder latency: The encoder is assumed to be reasonably pipelined and the delay is assumed to be about 40% of frame delay. In that case, the delay is roughly 15 ms for a 30-fps transmission. Further computational pipelining of the encoder can reduce this number.

(3) Mux buffering at controller 114: This is a buffering delay that can be used for rate control. It is expected to have about 5–10 ms of buffering that can be used for this purpose.

Of these latencies, it is assumed that only the encoder and mux buffer latencies can be controlled. Increased buffering latency at controller 114 is desirable from the rate-control point of view since it gives more time for controller 114 and the encoder to respond to changing traffic conditions. It is assumed that the latency at the decoder cannot be controlled, although this knowledge can be used to design coding modes that reduce this latency.

The latency estimates for video processing system 100 total less than 100 ms.

Strategies for Reducing Latency

As latency is reduced in specific components, greater ability is obtained to fine-tune the encoder and adapt to changing content and traffic conditions using some or all of the following strategies:

Simple Profile Encoding: Since B pictures lead to re-ordering delays, in order to maintain low latency, encoding is performed with only I and P pictures. In addition, using dual-prime motion vectors can result in improved compression efficiency for IP-only encoding.

Pipelining the encoder: Computational pipelining refers to performing all the encoding tasks on a minimum unit of encoding, e.g., macroblock, slice. Typical hardware encoders use hierarchical motion search and cannot be pipelined entirely. On the other hand, in software encoders, the hierarchical motion estimator can be tailored to start a slice-level pipeline after 3 rows of macroblocks are available.

Field pictures: One possibility is to perform field-picture encoding (even though material is progressive). The decoding delay will only be one field interval and this will save ½ frame interval in decoding delay. The encoding algorithm would have to be tailored for this coding mode. The fields can either be from the same progressive frames at 30 frames/sec in which case the top and bottom fields are at the same time instant, or they can come by sampling at 60 frames/sec and throwing away alternate fields. The latter solution may better match the interlaced display in the home. In both cases, special preprocessing may then become necessary. The algorithms can be tailored to enable good quality while using this field-picture mode.

Algorithmic Improvements for Game/Web Content Encoding

In addition to the above-mentioned low latency improvements, a number of other possible improvements can be implemented to improve the coding performance, as well as reduce latencies for graphics and web content.

Pre-Encoding of Static Portions of Web/Email Browsers

If browser signals were intercepted, it would be possible to pre-encode the various options and pop-up menus. This can lead to better I-frame coding of the static portions and so will require fewer bits subsequently. The constancy in the quality of the browser menus and icons will improve the perceptual quality considerably. The encoding latency will be reduced, though this is not a major issue in these applications. However, the savings in cycles could be significant enough to allow more web/email users to be admitted at the same time.

Region-of-Interest Encoding

Many games have specific regions of interest that are of more importance to the player. For example, most games have a center-weighted region of attention. This can be exploited in the bit-allocation strategy within a frame. Furthermore, it can also be used for intelligent packet-dropping at controller 114 when buffer or latency requirements are not met.

Encoder Parameter Tuning

The following encoding parameters can be tuned to improve the compression efficiency for game/web content. Note that hardware encoders are usually tuned for natural video scenes and hence might not perform as well on graphics and text content.

(a) Rate control initialization: A careful initialization of the rate control to match the multiplexer operation as well as the GOP structure can provide substantial improvements in quality.

(b) Quantizer matrix selection: The quantizer matrices commonly used are tailored to natural video. Matrices can be developed that are tailored to graphics and text.

(c) Perceptually adaptive quantization: In MPEG-2 encoding, the complexity or activity of a block is used for perceptually adaptive quantization. These computations should be modified for graphics and text content, and different measures of activity and distortion should be used.

(d) Pre-processing: The final output display device is interlaced, even though the encoded material is progressive. Further, field picture coding modes are proposed to reduce latency. Thus, suitable pre-processing by vertical filtering, etc. is essential for good display quality.

(e) Low-latency scene change detection: If scene changes are quickly detected, controller 114 can be provided with this information to allow it to respond by changing the allocations for various applications and perhaps postponing intra frames on other channels whenever possible.

(f) Encoding complexity estimation: Rate-distortion models enable prediction of encoding complexities for a frame based on distortion parameters. These models will be useful for the advance allocation statistical multiplexer. However, the models have mostly been developed for natural video and need modifications for game and web content.

Distributed Intra-Refresh Strategies

A large amount of application bit-rate fluctuations come from changes in picture types with I frames typically using more bits than P frames. This fluctuation can be reduced by distributing the intra-coding of macroblocks over a number of P frames. In the absence of scene changes, this strategy can yield a relatively smooth bit-rate profile. This choice can easily be implemented on software encoders, but not on hardware encoders.

Motion Estimation Complexity Reduction

In text browsing application, motion is typically very even and translational across a region of the image. This assumption can be used to reduce the complexity of motion estimation. For example, within a row, motion estimation could be performed on a subset of the macroblocks and if the motion is determined to be similar, the same motion vector can be used for the other macroblocks.

Motion estimation complexity can be reduced by exploiting the knowledge about the graphics commands. Intercepted graphics commands can be used to quickly and accurately estimate motion without going through the complete search process. Again, this may lead to significant computational savings.

Dynamic Frame Rate Selection and Spatial Resolution Change

The frame rate can be dynamically adjusted based on the content and the state of controller 114. In cases where the channel is overloaded, frame rates could be reduced to maintain acceptable spatial quality. Note that this solution will mainly work for intermediate- to low-interactivity applications. Another innovation would involve dynamic changes is spatial resolution (to half-horizontal, for example), whenever the content is less detailed or whenever channel constraints so dictate. In MPEG-2 encoding, this is done at the GOP level, rather than at the picture level. However, this is a better response to channel congestion than the catastrophic case handling described in the previous section.

Dynamic GOP Structure

The GOP structure can be limited to a relatively simple structure consisting of an I frame followed by a number of consecutive P frames. The frequency of I frames can be dynamically adjusted by controller 114 across the encoders in order to stagger the I frames to take advantage of statistical multiplexing gains. In many cases, due to scene changes, an encoder might start I-frame encoding at instances when it was not scheduled. In those cases, controller 114 should delay and reschedule I frames for the other encoders in order to maintain QoS across different applications.

Miscellaneous Features

In addition, depending on the implementation, controller 114 may be able to perform one or more of the following miscellaneous features:

- Scheduling I frames based on advance knowledge acquired from the application. In general, controller 114 uses advance knowledge from a video application to control the encoding process for that application. One method is when an application like a web-browser can anticipate a scene change when a user clicks a new page, and inform controller 114. Controller 114 can anticipate a large bit rate for the frame and use it to control the compression processing of the other video applications as well as this particular application. For example, any scheduled I frames of the other applications can be switched to adaptive refresh mode.
- Use of adaptive intra-refresh for handling scene changes. This can include the use of intra-macroblocks in the region of interest as a means of control when a scene change has occurred.
- In case controller 114 cannot match the latency requirement for a particular video application, it sends a signal back to the application delaying the application. Thus, the application knows that the user has not been given a chance to respond and thus pauses. This is useful in high-interactivity services like video games. This delay can be achieved by using the pause command available on many applications.
- Use of region-of-interest (ROI) information by controller 114. One way is for the encoder to send priority information on groups of macroblocks. Controller 114 then drops the low-priority regions in case of congestion. In addition or alternatively, controller 114 uses pre-encoded portions of the bitstream and does some bit-stream manipulation. This can be used in web-browsing and for backgrounds of games. In particular, the pre-encoded portions will be used for sections outside the ROIs, as a special method for handling ROI-based control.

Summary

The proposed statistical multiplexer tools offer the following advantages over other off-the-shelf multiplexers:

1. Exploiting the varying QoS requirements to improve channel utilization while providing an acceptable quality for all applications;
2. Reacting to the less controllable encoders by exercising rate control measures on the more controllable software encoders;
3. Taking advantage of the knowledge about the software encoder to improve perceptual quality;
4. Achieving low latency through advance allocation of bit budget and through proper buffer management at the multiplexer;
5. Making frame-level bit allocation proportional to content complexity; and
6. Performing graceful degradation of quality during congestion through better understanding of the effect of packet dropping from profiling and by effectively communicating with the controllable encoders.

Channel Surfing

In some cases, a user may decide to keep his initial application running on one channel while surfing other channels in order to return the initial application. Or, he may run two sessions in parallel and switch between sessions. These cases should be handled effectively, including taking advantage of these situations to reduce transmission bandwidth. For example, after detecting that the user has moved to another channel (e.g., based on monitoring the return path and the content served), a low-bit-rate slide show (e.g., I frames spaced relatively far apart) can be sent for decoder resynchronization when the user comes back to the original interactive application. If the slide show lasts longer than a certain timeout period, the user's session can be automatically terminated. An alternative can be to save the game for later resumption.

Possible System Architecture

Low-delay MPEG2 video/audio encoding and statistical multiplexing are key technical requirements for many Digital Television (DTV) and digital cable TV applications. In a conventional low-cost PCI (Peripheral Component Interconnect) bus-based computer system, significant processing delays are contributed by the system control, program layer PES (Packetized Elementary Stream) and transport TS (Transport Stream) multiplexing, and the PCI bus. In particular, the PCI bus delay will introduce uncertain delays based on the PCI-BIOS (PCI Basic Input/Output System and the Windows™ operating system from Microsoft Corporation of Redmond, Wash.

Computer systems in accordance with the present invention avoid PCI bus delay by using the built-in multi-channel Synchronized Serial Interface (SSI) ports of multiple Digital Signal Processors (DSPs), where each DSP performs video and audio encoder control, PES/TS layer multiplexing, and computation of statistical measurements of its corresponding video stream payload. The DSPs' on-chip memories may also eliminate the need for bitstream First-In, First-Out (FIFO) chips and some common SDRAM (Synchronized Dynamic Random Access Memory) chips.

FIG. 3 shows a system-level block diagram of computer system 300, according to one embodiment of the present invention. Computer system 300 is a PCI bus-based industrial PC (Personal Computer) enclosure with multiple PCI boards. In particular, computer system 300 comprises a PCI bus 302 configured with a Central Processing Unit (CPU) board 304, up to n=24 encoder boards 306, and a statistical multiplexing (stat-mux) board 308. Although computer system 300 relies on a PCI bus, it will be understood that any other suitable system bus could be used in alternative embodiments of the present invention.

CPU board 304 is a conventional industrial PC motherboard having a suitable central processor, such as an Intel Pentium III™ microprocessor by Intel Corporation of Santa Clara, Calif. In addition, CPU board 304 has a conventional PCI interface 310, an ISA (Industry Standards Association) bus interface 312, RS232 ports 314, a (e.g., 100-MHz) Local Area Network (LAN) interface 316, a hard disk/floppy disk (HD/FD) controller, and other standard PC periphery interfaces. Software (e.g., in the "C" programming language) implemented by the Pentium processor may provide main system controls, fault-tolerant controls, and/or statistical multiplexing of those bitstreams that do not have low-latency requirements.

Each encoder board 306 is an integrated video/audio encoder with an SDI (Serial Digital Interface or Serial DI) or ASI (Asynchronous Serial Interface) input port 318, a video encoder 320, an audio encoder 322, a PCI bus interface 324, and a DSP controller 326 (with an SSI port 328) for board-level sub-system control and low-delay PES/TS multiplexing plus bitstream statistics parameter measurement.

Stat-mux board 308 has a PCI bus interface 330 and four DSP chips 332, where each DSP chip 332 has a six-channel SSI DMA (Direct Memory Address) 334 with six SSI ports 336, SRAMs 338, two DSP cores 340, and an ASI/TAXI™ chip set from Advanced Micro Devices, Inc., of Sunnyvale, Calif., and, in block 342, a DHEI (Digital High-speed Expansion Interface) I/O port from General Instrument Corporation (GI) of Horsham, Pa., for GI's modulator and CA (Conditional Access) equipment. As such, stat-mux board 308 can support up to 24 channels of low-delay MPEG2 video/audio input bitstreams.

PCI bus 302 is used for power supply and system control for each PCI board. A DSP chip on each encoder board 306 will directly transfer low-delay MPEG2 bitstreams to a corresponding DSP on stat-mux board 308. In particular, each low-delay MPEG2 video/audio bitstream will be directly transmitted from the SSI port 328 of the corresponding encoder board 306 to an SSI port 336 on stat-mux board 308. The associated delay can be controlled to correspond to as few as four transport packet delays, with a two-packet delay in the encoder DSP 326, a one-packet delay at an input port 336 of stat-mux board 308, and a one-packet delay at an output port 342 of stat-mux board 308. In addition, PCI bus 302 can be used to transmit additional MPEG2 video/audio bitstreams that do not have low-latency requirements. Depending on the implementation, these high-latency bitstreams may be generated by video/audio encoders implemented in software within the central processor on CPU board 304.

Figure 4:
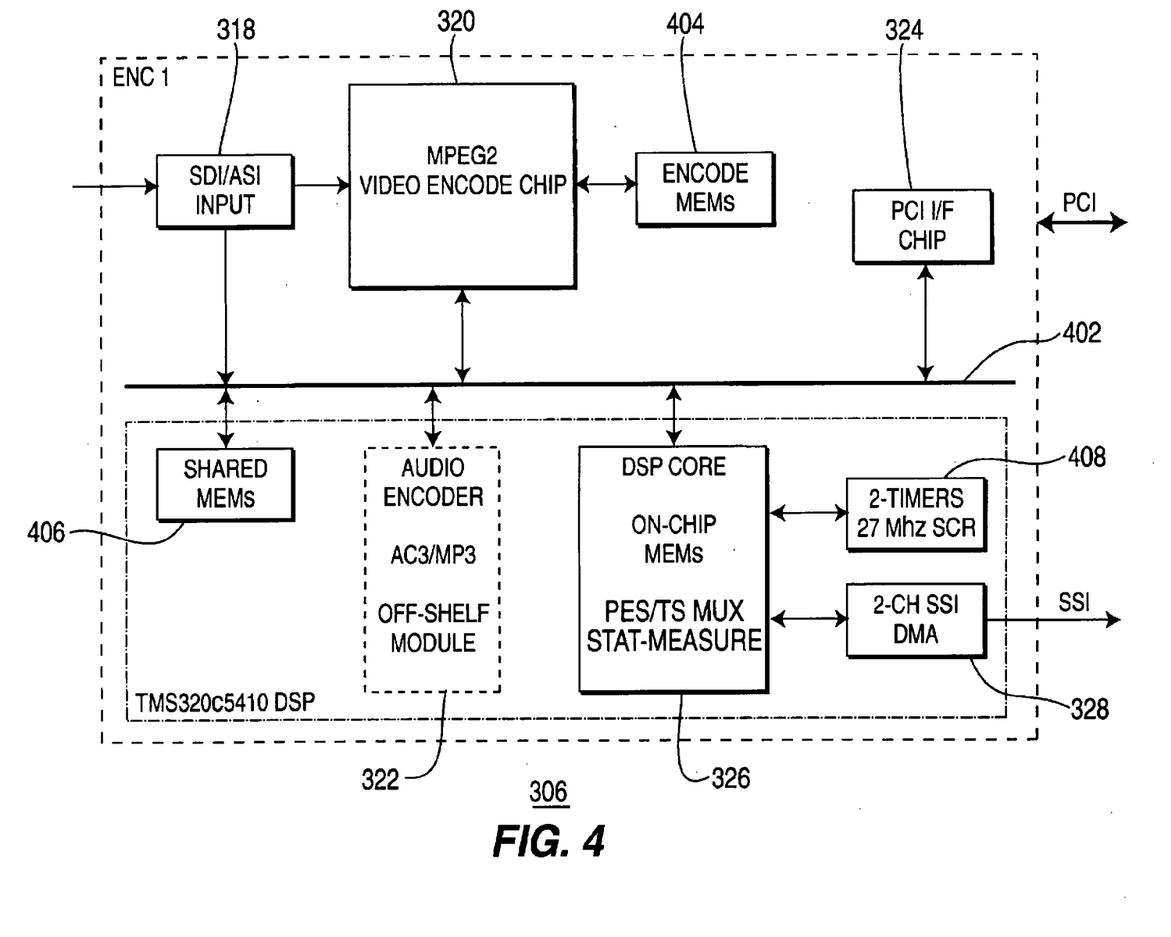
FIG. 4 shows a board-level block diagram of each encoder board of the computer system of FIG. 3.

FIG. 4 shows a board-level block diagram of each encoder board 306 of computer system 300 of FIG. 3, according to one embodiment of the present invention. Encoder board 306 comprises an internal board bus 402 configured with an input interface module 318, an MPEG2 video encoder 320, an AC3 or MP3 audio encoder module 322, a DSP controller 326 with PES/TS-layer multiplexing firmware, and 27-MHz SCR/PCR circuits 408, where SCR is the System Clock Reference in an MPEG video decoder and PCR is the Program Clock Reference in an MPEG transport decoder.

Input interface module 318 can support both SDI and ASI circuits with a 270-MHz or 180-MHz line-coded clock, respectively. The SDI or ASI signals can be customized to interlace the uncompressed digital video data and multichannel audio data. There is CPLD (Complex Programmable Logic Device) or FPGA (Field-Programmable Gate Array) based deframing firmware to split the video and audio data, and to reproduce the video synchronization signals for the MPEG2 video encoder chip.

MPEG2 video encoder 320 can be any suitable single-chip encoder, such as those supplied by IBM, C-Cube, or Philips, with supporting SDRAM, SRAM, and/or flash memories 404 and necessary glue logic circuits. The glue logic can be combined within the input CPLD firmware. There are also some downloadable micro-codes from the MPEG2 chip manufacturer.

Audio encoder 322 can be any suitable off-shelf DSP-based sub-system that can support either the AC3 or MP3 encoding function depending on the DSP software. If a TMS320c5410 DSP chip from Texas Instruments Incorporated of Dallas, Tex. is used, then the audio encoding functions of audio encoder 322 can be combined with DSP controller 326, shared memories 406, and the PES/TS multiplexing firmware for less board area and lower integration costs.

Alternatively, DSP 326 may be a TMS320c5402 DSP from Texas Instruments. DSP 326 will provide of video encoder control, audio encoder control, the SCR/PCR time-base controls, and the overall board-level controls. It will also perform the PES/TS multiplexing of compressed video and audio bitstreams, and the statistical parameter measurements of the video stream. It will also execute the commands of statistical multiplexing controls received from PCI bus 302 of FIG. 3.

DSP on-chip SSI output port 328 can be directly connected to an SSI input port of a DSP on stat-mux board 308 of FIG. 3. The on-chip DMA will automatically move data from the TS output buffer of on-chip memory to the serial output port. The TMS320c5410 DSP has 128 Kbytes of on-chip memory and a DMA-controlled host interface port, such that external SRAM and FIFO devices may be eliminated. For example, when video encoder 320 is an IBM39 MPEGS422 video encoder chip, the video encoder can directly write its compressed video data into the TMS320c5410 on-chip SRAM with a simple CPLD to emulate the FIFO signals. The PES/TS MUX delay can be within transmitting two TS packets of video streams, such as 2×188×8*video_rate delay.

DSP on-chip timer 408 can also be programmed for the 27-MHz SCR/PCR time-base by incorporating on-chip PLL (Phase-Locked Loop) circuits. All of the 27-MHz clocks will be derived from the same 27-MHz clock on stat-mux board 308 through the clocks of the SSI ports connected to all of the encoder boards 306.

Figure 5:
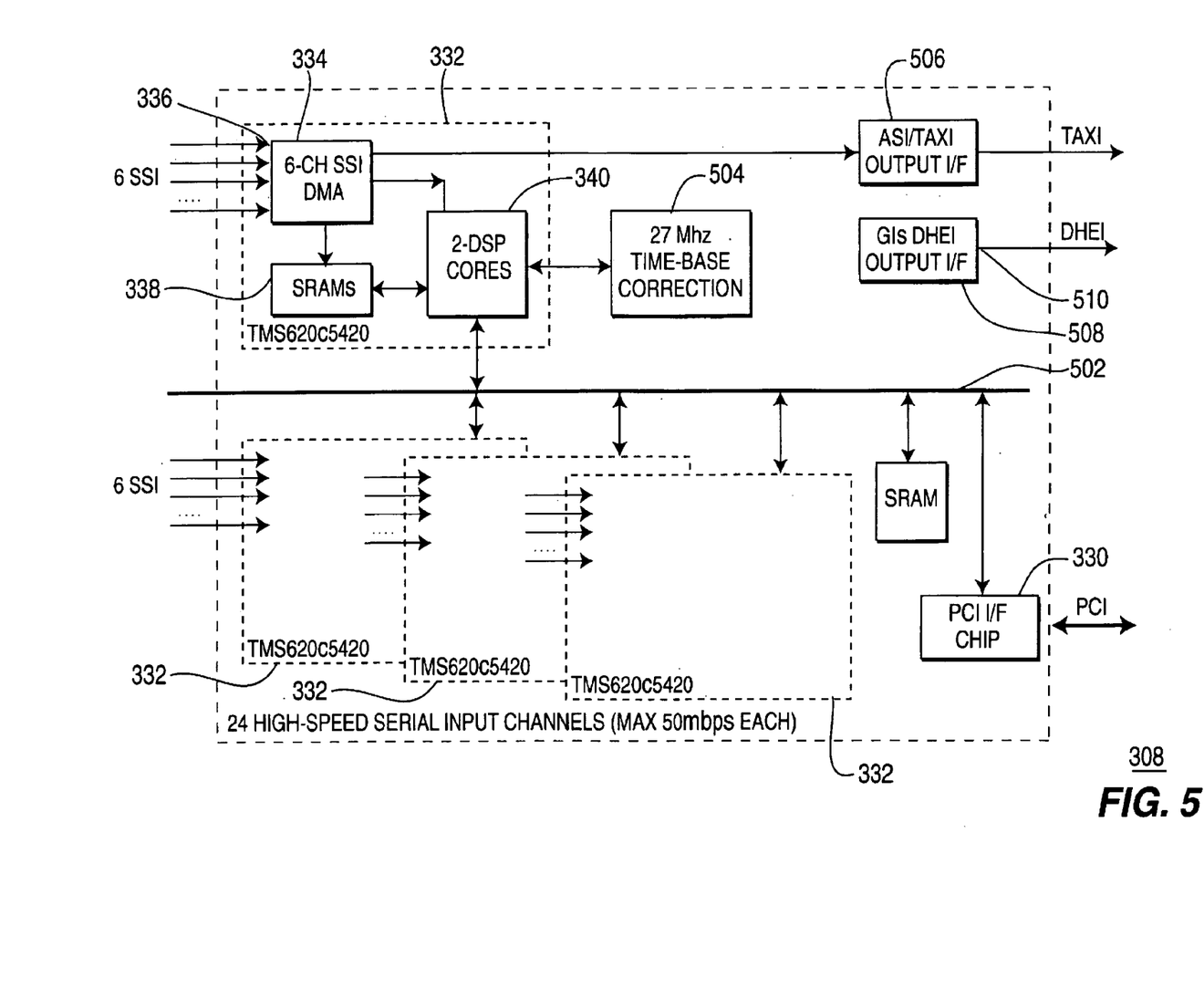
FIG. 5 shows a board-level block diagram of the statistical multiplexing board of the computer system of FIG. 3.

FIG. 5 shows a board-level block diagram of statistical multiplexing board 308 of computer system 300 of FIG. 3, according to one embodiment of the present invention. Stat-mux board 308 is a low-delay Input/Output (I/O) interface PCI board with the statistical multiplexing system and PCR time-base correction firmware. Stat-mux board 308 comprises an internal sub-system bus 502 configured with four Texas Instruments TMS320c5420 DSP chips 332, each having six SSI serial ports 336 and 512 Kbytes of on-chip SRAM memory 338, such that stat-mux board 308 can receive up to 24 different channels of transport bitstreams.

Each SSI serial input port 336 has three wires carrying a clock signal (sclk), a data signal (sdat), and a frame signal. All 24 clock signals sclk should be configured as the input clock signals and connected to an on-board 27-MHz clock oscillator 504. 27-MHz clock 504 will also be used as the DSP clock, and on-chip PLL circuits will generate a 90-MHz DSP clock. In that case, on-chip timers can be used for the PCR time-base corrections. The frame signals will indicate whether or not the data signal sdat carries meaningful data. The data signals sdat are burst with a maximum rate of 27 Mbps. The frame signals can also be programmed in a "multi-channel mode" to send multiple packets into assigned on-chip buffers for transmitting the individual encoders' statistical parameters.

ASI interface 506 uses a TAXI transmitter chip with parallel interface from Advanced Micro Devices, such that there are FIFO and CPLD control circuits to handle the TAXI interface and ASI controls. A DHEI interface 508 from GI will need additional PLL circuits to generate the output clock, if there is no available input clock signal from DHEI port 510. There are also the DHEI line drive chips for the proper bi-level output interface.

Although the present invention has been described in the context of a computer system in which each of the central processing sub-system, the statistical multiplexing sub-system, and each encoding sub-system is implemented on a separate computer board of the computer system, the present invention is not so limited. In particular, two or more of the different sub-systems could be implemented on a single board. Alternatively or in addition, any of the sub-systems could be implemented on more than one board. The important characteristics of the present invention relate to how the various components of the different sub-systems communicate with one another, rather than where those components are physically located.

Although the present invention has been described in the context of a system having a central processing sub-system, in addition to the statistical multiplexing sub-system and multiple encoding sub-systems, all of which are configured to a PCI bus, it will be understood that the present invention is not so limited. In particular, the present invention can also be implemented in computer systems in which there is no separate central processing sub-system, but where all of the centralized control functions are implemented in the DSPs of the statistical multiplexing sub-system. Moreover, such a computer system may be implemented with or without a system bus, such as a PCI bus.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer system adapted to (1) generate a compressed bitstream for each of a plurality of independent input data streams and (2) combine the resulting plurality of compressed bitstreams into a single multiplexed output data stream, the computer system comprising:

(a) one or more encoding sub-systems, each encoding sub-system adapted to receive a different one of the independent input data streams and generate a corresponding compressed bitstream;

(b) a central processing sub-system adapted to receive at least one of the independent input data streams and generate a corresponding compressed bitstream;

(c) a statistical multiplexing (stat-mux) sub-system adapted to combine the compressed bitstreams from the one or more encoding sub-systems and from the central processing sub-system into the single multiplexed output data stream; and (d) a system bus connected to each encoding sub-system, to the central processing sub-system, and to the stat-mux sub-system, wherein:

each encoding sub-system is further connected directly to the stat-mux sub-system such that the compressed bitstream from said each encoding sub-system is transmitted directly to the stat-mux sub-system without being transmitted over the system bus;

each compressed bitstream generated by the central processing sub-system is transmitted to the stat-mux sub-system via the system bus;

each input data stream has a specified desired latency level;

at least two input data streams can have different specified desired latency levels; and the stat-mux sub-system is adapted to apply statistical multiplexing taking into account the corresponding specified desired latency level for each input data stream to:

generate and transmit control signals back to each encoding sub-system and to the central processing sub-system to control encoding processing used to generate the corresponding compressed bitstreams from the corresponding input data streams; and control how the resulting compressed bitstreams are combined to form the single multiplexed output data stream.

2. The invention of claim 1, wherein the computer system comprises two or more such encoding sub-systems, each adapted to generate a different compressed bitstream for a different, independent input data stream.

3. The invention of claim 2, wherein the two or more different compressed bitstreams generated by the two or more encoding sub-systems can have different specified desired latency levels.

4. The invention of claim 1, wherein the central processing sub-system is adapted to generate simultaneously two or more different compressed bitstreams from two or more different, independent input data streams.

5. The invention of claim 4, wherein the two or more different compressed bitstreams generated by the central processing sub-system can have different specified desired latency levels.

6. The invention of claim 1, wherein each input data stream is a different audio/video stream.

7. The invention of claim 1, wherein the one or more compressed bitstreams generated by the one or more encoding sub-systems have lower specified desired latency levels than the one or more compressed bitstreams generated by the central processing sub-system.

8. The invention of claim 1, wherein:

each encoding sub-system has a synchronized serial interface (SSI) output port;

the stat-mux sub-system has an SSI input port for each SSI output port in the one or more encoding sub-systems; and each compressed bitstream generated by a corresponding encoding sub-system is transmitted from the SSI output port of the encoding sub-system to the corresponding SSI input port of the stat-mux sub-system.

9. The invention of claim 1, wherein the system bus is a PCI bus.

10. The invention of claim 1, wherein each encoding sub-system and the central processing sub-system generate statistics about the corresponding compressed bitstreams and transmit those statistics to the stat-mux sub-system for use in performing the statistical multiplexing.

11. The invention of claim 1, wherein:

the computer system comprises two or more such encoding sub-systems, each adapted to generate a different compressed bitstream for a different, independent input data stream;

the two or more different compressed bitstreams generated by the two or more encoding sub-systems can have different specified desired latency levels;

the central processing sub-system is adapted to generate simultaneously two or more different compressed bitstreams from two or more different, independent input data streams;

the two or more different compressed bitstreams generated by the central processing sub-system can have different specified desired latency levels;

each input data stream is a different audio/video stream;

the compressed bitstreams generated by the encoding sub-systems have lower specified desired latency levels than the compressed bitstreams generated by the central processing sub-system;

each encoding sub-system has a synchronized serial interface (SSI) output port;

the stat-mux sub-system has an SSI input port for each SSI output port in the one or more encoding sub-systems;

each compressed bitstream generated by a corresponding encoding sub-system is transmitted from the SSI output port of the encoding sub-system to the corresponding SSI input port of the stat-mux sub-system;

the system bus is a PCI bus; and each encoding sub-system and the central processing sub-system generate statistics about the corresponding compressed bitstreams and transmit those statistics to the stat-mux sub-system for use in performing the statistical multiplexing.

* * * * *